No. 792,112.

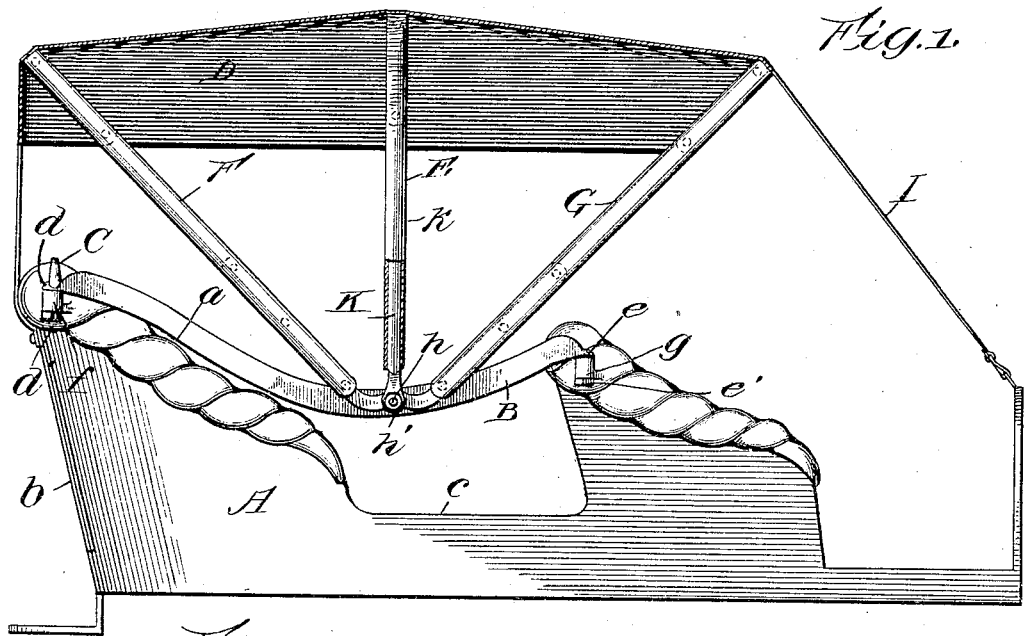
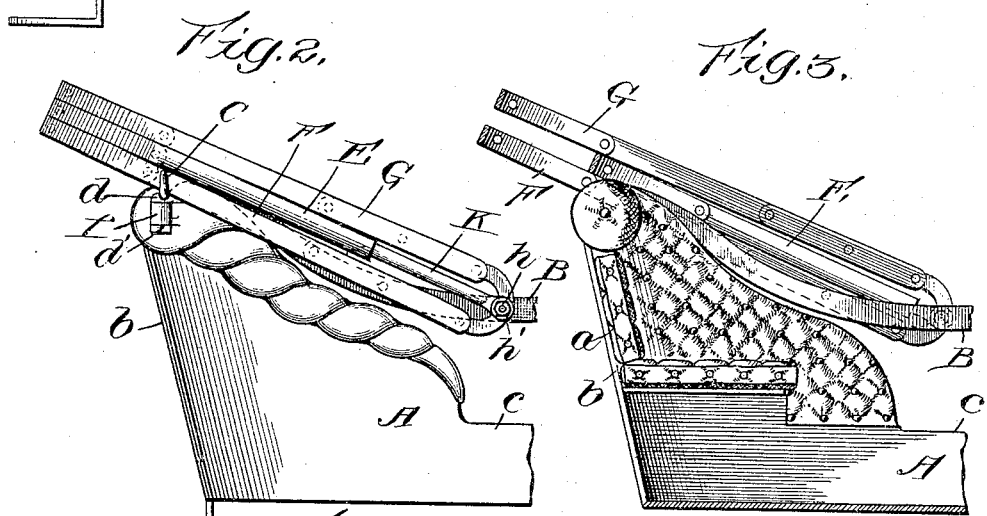
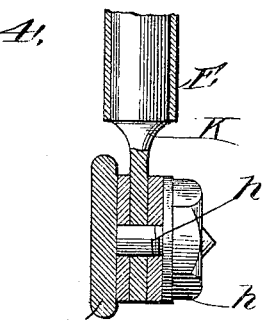

Patented June 13, 1905.

UNITED STATES PATENT OFFICE.

WALTER NEWTON BEECHER, OF CHICAGO, ILLINOIS.

FOLDING TOP FOR AUTOMOBILES.

SPECIFICATION forming part of Letters Patent No. 792,112, dated June 13, 1905.

Application filed November 7, 1904. Serial No. 231,733.

*To all whom it may concern:*

Be it known that I, WALTER NEWTON BEECHER, a citizen of the United States, and a resident of Chicago, in the county of Cook and State of Illinois, have invented certain new and useful Improvements in Folding Tops for Automobiles, of which the following is a full, clear, and exact description.

My invention relates to folding canopy-tops for vehicles, and particularly for the well-known style of automobiles known as the "tonneau," the peculiar feature of which is the rear seats, to which access is usually had from the rear of the body of the machine.

The principal object of my invention is to provide a top which when open will have a horizontally-disposed canopy that will cover the vehicle from a point mediate the plane of the dashboard and the front to a point back of the rear seat and which when folded back can have the legs of its central bow telescopically elongated, so that it will not interfere with occupants entering or leaving the inclosure in which the rear seats are located. This I accomplish in a simple and economic manner, substantially as hereinafter fully described and as particularly pointed out in the claims.

In the drawings, Figure 1 is a side view of the body of an automobile of the style known as the "tonneau," showing my improved canopy-top applied thereto in an open position. Fig. 2 is a side view of the broken-away portion of the same with the canopy-top in a lowered or closed position. Fig. 3 is a longitudinal section of the car, showing the same lowered with the central bow in the position it occupies before it is moved into the position shown in Fig. 2. Fig. 4 is a detail view showing in section a broken-away pivoted end of the central bow and elements to which the same is connected.

Having reference to the accompanying drawings, A represents the body of the style of automobile known as the "tonneau," the peculiarity of which is that it has rear seats $a$, access to the inclosure in which said seats are placed being had through a door $b$ in the rear of the body A and, in the style of tonneau shown in the drawings, also in the sides of said body. My invention, however, is more for the purpose of facilitating the ingress and egress of the occupants of the car through the rear door of the body when the folding canopy-top is down.

A bridge B is provided for each side of the body of the vehicle, which consists of a metal bar the ends of which are provided with upwardly or downwardly projecting studs $d$ and $e$ and are adapted to be inserted and seated in vertically-disposed tubular sockets $f$ and $g$, that are suitably secured to and project from the ends of the forward seat, near the top thereof, and the end of the rear seat, near the top thereof, respectively. The ends of these studs preferably extend through said sockets and are screw-threaded and provided with suitable nuts $d'$ and $e'$, respectively. The rear end of the bridge just above the stud is provided with a laterally-projecting hook C, into which the bows of the top fall and by which they are retained when the said top is down.

The folding top comprises the canopy D, which is supported by a central bow E and end bows F and G. These bows have the ends of their legs either directly or indirectly pivoted on a stud $h$, projecting laterally from the bridge in a plane preferably just forward of the rear seats, and are retained thereon by a suitable washer and nut $h'$, screwed onto the outer end of the stud. When the top is open, the canopy is, barring a slight dip from its center of length toward each end, horizontally disposed. The central bow E is perpendicular, and the end bows are inclined at an angle of, say, ninety degrees, (90°,) the one in one direction and the other in the opposite direction. In order to support the canopy in its horizontal position, therefore, the end bows have to reach out farther, and consequently are longer than the central bow E. Now when the top is lowered by unfastening the stay-straps I, connecting the front bow to the dashboard, and moving the bows to the rear until they rest in the hooks C the horizontal portion of the central bow will fall considerably shorter than the like portions of the end bows and will interfere with ingress to and egress from the rear seats through the rear door of the body of the car. I am able to overcome this difficulty by making the legs $k$ $k$ of the central bow tubular and not have them connected direct to the pivotal stud $h$, but telescopically engage extension-rods K, which have one end pivotally secured to stud $h$ and the other end entering and having sliding engagement in and out of the bore of said tubular legs $k$. Thus constructed when the top is lowered, as shown in Fig. 3 of the drawings, the central bow is pushed rearwardly until its horizontal portion is between the similar portions of the end bows, as shown in Fig. 2 of the drawings. When the bows are in this latter position, a person can easily stand under them and step up through the rear door of the body without interference. When it is desired to raise the top, the spreading apart of the end bows to straighten out the canopy automatically causes the tubular ends of the central bow to move down over the rods K into the position shown in Fig. 1.

If desired, the ends of the central bow may be solid and telescope into tubular extension-rods. I prefer, however, the construction shown. I could further modify the construction of my invention should occasion require it by using two intermediate bows whose legs are tubular. This construction would be particularly adaptable to what is known as "extension-tops."

What I claim as new is—

1. A folding top for a vehicle comprising a flexible canopy, and end and intermediate bows the extremities of which are pivoted in transverse alinement, and the central bow of which has telescopic leg extensions.

2. A folding top for a vehicle comprising a flexible canopy, and end and intermediate bows the extremities of which are pivoted in transverse alinement and the legs of the central bow extensible longitudinally.

3. A folding top for a vehicle comprising a flexible canopy, and end and central bows for supporting the same, said central bow having tubular legs and rods pivoted in alinement with the ends of said end bows which are telescopically engaged by the legs of the central bows.

4. A folding top for a vehicle comprising a flexible canopy, and end and intermediate bows the extremities of which are pivoted adjacent to each other, and the central bow of which has telescopic leg extensions.

5. A folding top for a vehicle comprising a flexible canopy, and end and intermediate bows the extremities of which are pivoted adjacent to each other and the legs of the central bow extensible longitudinally.

6. A vehicle in combination with a folding top comprising a flexible canopy, end and intermediate bows the extremities of which are pivoted adjacent to each other, and the central bow of which has telescopic leg extensions, and a bridge connecting the ends of the front and rear seats of said vehicle.

7. A vehicle in combination with a folding top comprising a flexible canopy, end and intermediate bows the extremities of which are pivoted adjacent to each other and the legs of the central bow extensible longitudinally, and a bridge connecting the ends of the front and rear seats of said vehicle.

8. A vehicle in combination with a folding top comprising a flexible canopy, end and intermediate bows for supporting the same, said central bow having tubular legs and rods pivoted adjacent to each other, the ends of said end bows telescopically engaging the legs of said central bow, and a bridge connecting the ends of the front and rear seats of said vehicle.

9. A vehicle having front and rear seats, and a rear door providing access to the latter, in combination with a folding top therefor comprising a flexible canopy and end and central bows for supporting said canopy, said central bows having longitudinally-extensible legs, and bridges connecting the ends of the seats of said vehicle to which the ends of said bows are pivotally connected.

10. A vehicle comprising front and rear seats, and a rear door providing access to the latter, in combination with a folding top therefor comprising a flexible canopy and end and central bows for supporting said canopy, said central bows having longitudinally-extensible legs, and bridges to which the ends of said bows are pivoted and which have their ends provided with studs, and sockets secured to the ends of said seats in which said studs are seated.

11. A vehicle having front and rear seats, and a rear door through which access is had to the latter, in combination with a folding top comprising a flexible canopy, end and central bows for supporting the same, said central bow having tubular legs, and rods pivoted adjacent to the pivoted ends of said end bows, and bridges connecting the ends of said forward and rear seats to which said bows are pivotally connected.

12. A vehicle having front and rear seats and a rear door through which access is had to the latter, in combination with a folding top comprising a flexible canopy, end and central bows for supporting the same, said central bow having tubular legs, and rods pivoted adjacent to the pivoted ends of said end bows, and bridges to which the ends of said bows are pivotally connected which are provided with studs on their ends and sockets secured respectively to the ends of the forward and rear seats in which said studs are seated.

13. A vehicle having front and rear seats and a rear door through which access is had to the latter, in combination with a folding top comprising a flexible canopy, end and central bows for supporting the same, said central bow having tubular legs, and rods pivoted adjacent to the pivoted ends of said end bows, and bridges to which the ends of said bows are pivotally connected which are provided with studs on their ends the lower extremities of which are screw-threaded, sockets secured respectively to the ends of the forward and rear seats through which said studs extend and nuts engaging the lower ends of said studs.

14. The combination with an automobile-body, of a top comprising front and rear bows and an intermediate bow made in sliding sections, whereby the length of the latter bow may be varied.

15. In an automobile-top, the combination of a pair of front and rear bows provided with means for pivotal connection at their ends, and an intermediate bow having sliding sections at its ends, whereby the length of said intermediate bow may be varied.

16. In an automobile-top, the combination with the front and rear bows, and a covering supported by said bows, of an intermediate bow having sockets and slidable end pieces held in said sockets.

In testimony whereof I have hereunto set my hand this 1st day of October, A. D. 1904.

WALTER NEWTON BEECHER.

Witnesses:
FRANK D. THOMASON,
E. K. LUNDY.